US009086153B2

(12) United States Patent
Neumann et al.

(10) Patent No.: US 9,086,153 B2
(45) Date of Patent: Jul. 21, 2015

(54) ROTARY BEARING ARRANGEMENT WITH A SEALING ARRANGEMENT HAVING A CHAMBER WITH A DISINFECTANT BARRIER MEDIUM THEREIN

(75) Inventors: Bernd Neumann, Hamburg (DE); Matthias Bestmann, Hamburg (DE)

(73) Assignee: KHS GmbH, Dortmund (DE)

( * ) Notice: Subject to any disclaimer, the term of this patent is extended or adjusted under 35 U.S.C. 154(b) by 815 days.

(21) Appl. No.: 12/369,165

(22) Filed: Feb. 11, 2009

(65) Prior Publication Data

US 2010/0037986 A1 Feb. 18, 2010

Related U.S. Application Data

(63) Continuation-in-part of application No. PCT/EP2007/007191, filed on Aug. 15, 2007.

(30) Foreign Application Priority Data

Aug. 17, 2006 (DE) .......................... 10 2006 038 747

(51) Int. Cl.
*F16J 15/16* (2006.01)
*F16J 15/40* (2006.01)
(Continued)

(52) U.S. Cl.
CPC . *F16J 15/40* (2013.01); *B67C 3/22* (2013.01); *F16J 15/002* (2013.01); *F16J 15/004* (2013.01); *Y10T 29/49719* (2015.01)

(58) Field of Classification Search
CPC ......... F16J 15/002; F16J 15/004; F16J 15/40; B67C 3/22; B67C 2003/228; B23P 6/00
USPC ............ 277/408, 431, 432, 563; 384/99, 100, 384/114, 118–120, 130–132, 134, 139, 140, 384/147, 151–153; 141/144–152
See application file for complete search history.

(56) References Cited

U.S. PATENT DOCUMENTS 2,112,461 A * 3/1938 Kohler .......................... 277/385
3,734,580 A * 5/1973 Piscitelli ....................... 384/131
(Continued)

FOREIGN PATENT DOCUMENTS

CN 1791759 6/2006
DE 11 44 873 3/1963
(Continued)

OTHER PUBLICATIONS

English translation of Chinese Office Action 200780030530.9.
(Continued)

*Primary Examiner* — Alan B Waits
(74) *Attorney, Agent, or Firm* — Nils H. Ljungman & Associates

(57) ABSTRACT

A method of operating a rotary beverage bottle or container filling or handling machine with a bearing with a cleaning arrangement in an aseptic clean room in a beverage bottling or container filling plant. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

6 Claims, 11 Drawing Sheets

(51) Int. Cl.
  *B67C 3/22* (2006.01)
  *F16J 15/00* (2006.01)

(56) References Cited

U.S. PATENT DOCUMENTS

| | | | |
|---|---|---|---|
| 4,193,603 A * | 3/1980 | Sood | 277/304 |
| 4,222,575 A | 9/1980 | Sekiguchi et al. | |
| 4,447,062 A * | 5/1984 | Leicht | 277/347 |
| 5,636,847 A * | 6/1997 | Ostrowski | 277/317 |
| 5,865,441 A * | 2/1999 | Orlowski | 277/364 |
| 6,102,139 A | 8/2000 | Tibussek et al. | |
| 6,328,312 B1 | 12/2001 | Schmitz et al. | |
| 6,390,478 B1 | 5/2002 | Sigmundstad | |
| 6,443,618 B1 * | 9/2002 | Nishikawa et al. | 384/15 |
| 2004/0227302 A1 | 11/2004 | Burdick et al. | |
| 2005/0016624 A1* | 1/2005 | Till | 141/144 |
| 2005/0034779 A1* | 2/2005 | Bernhard | 141/90 |
| 2006/0011262 A1* | 1/2006 | Stienen | 141/147 |

FOREIGN PATENT DOCUMENTS

| | | | |
|---|---|---|---|
| DE | 35 16 128 | 11/1986 | |
| DE | 42 08 549 | 9/1993 | |
| DE | 296 20 323 | 1/1997 | |
| DE | 29620323 U1 | 1/1997 | |
| DE | 199 13 821 | 10/2000 | |
| DE | 694 23 493 | 11/2000 | |
| DE | 100 46 798 | 4/2002 | |
| DE | 202 12 246 | 10/2002 | |
| DE | 20 2005 014 423 | 2/2006 | |
| JP | 58125766 | 8/1983 | |
| JP | 62072966 A * | 4/1987 | F16J 15/40 |
| JP | 01312273 A * | 12/1989 | F16J 15/16 |
| JP | 2001204439 | 7/2001 | |
| JP | 2006103412 A | 4/2006 | |

OTHER PUBLICATIONS

International Preliminary Report on Patentability PCT/EP2007/007191 and English translation thereof.

* cited by examiner

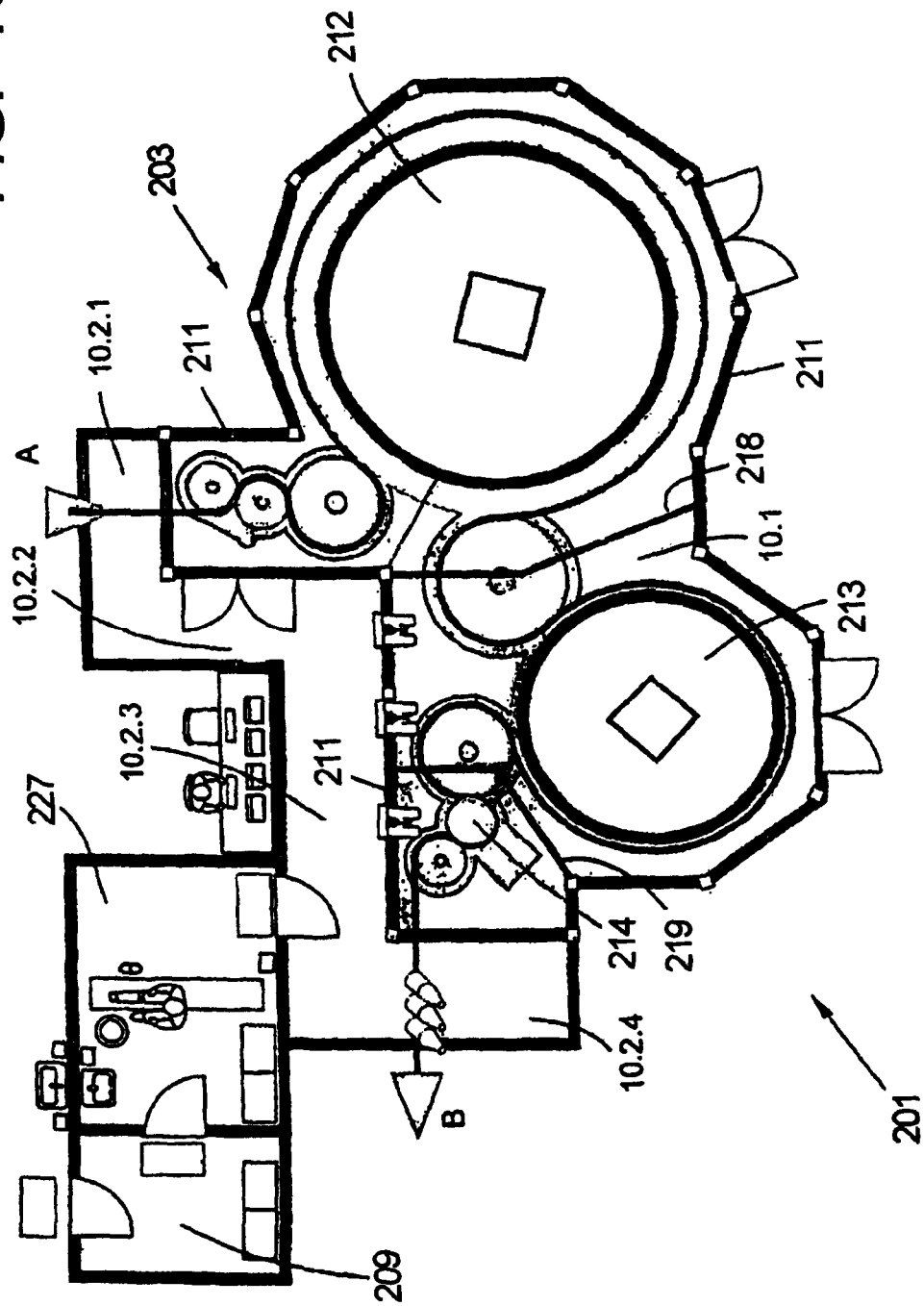

ROTARY BEARING ARRANGEMENT WITH A SEALING ARRANGEMENT HAVING A CHAMBER WITH A DISINFECTANT BARRIER MEDIUM THEREIN

CONTINUING APPLICATION DATA

This application is a Continuation-In-Part application of International Patent Application No. PCT/EP2007/007191, filed on Aug. 15, 2007, which claims priority from Federal Republic of Germany Patent Application No. 10 2006 038 747.3, filed on Aug. 17, 2006. International Patent Application No. PCT/EP2007/007191 was pending as of the filing date of this application. The United States was an elected state in International Patent Application No. PCT/EP2007/007191.

BACKGROUND

1. Technical Field

The present application relates to a method of operating a rotary beverage bottle or container filling or handling machine with a bearing with a cleaning arrangement in an aseptic clean room in a beverage bottling or container filling plant, and to a sealing arrangement for a pivot bearing device comprising a stationary part, a rotary part and a rotary distributor.

2. Background Information

Background information is for informational purposes only and does not necessarily admit that subsequently mentioned information and publications are prior art.

Such pivot bearing devices are used in such things as container, handling and filling machines for beverages, medicines, etc. Such a pivot bearing device provides a rotary connection between the rotary part of such a machine and the stationary part. The requirements for such pivot bearing devices vary as a function of the design of the machine.

In one important application, the pivot bearing device serves not only as a bearing for the rotary part of the machine, it also transfers liquid or gaseous products to the rotary part of the machine. This is performed with the aid of rotary distributors, by means of which a product supplied to the machine via line is passed to the rotary part of the machine, from where it is filled into the containers passing through the machine via a plurality of filling stations.

Additionally or alternatively, potential applications include those where sections of the machine that can also comprise rotary parts are largely isolated from the environment. This is done by enclosing these parts of the machine in a housing whose interior is accessible via defined paths. The interior of the housing can thus be kept practically germ-free, for example, to permit the aseptic handling and filling of beverage or medicine containers, for example. Such applications require and/or desire that the rotary connections are also designed such that no undesired substances can reach the interior of the housing.

Conventional sealing systems for pivot bearing devices often do not fulfill the required and/or desired specifications for this with respect to tightness and long-term resistance of the seal. Furthermore, the inspection and maintenance of conventional sealing systems is time-consuming and complex, and typically requires and/or desires the dismantling of the connection to determine whether a seal is still sufficiently functional. In addition, seal malfunctions regularly can be detected when contamination of the cleanroom area is well advanced, possibly having already rendered large portions of the containers handled therein unusable.

OBJECT OR OBJECTS

The object of the present application is to provide a sealing arrangement that has a long service life and essentially ensures and/or promotes a reliable sealing function while also permitting early detection of possible leaks in the system.

SUMMARY

The present application achieves this with a sealing arrangement for a pivot bearing device having a stationary and a rotary part, wherein between the stationary and the rotary part, there are at least two interspaced seals between which a chamber for receiving a barrier medium is arranged.

Simply providing two interspaced seals already improves the reliability of the seal. Penetration of an undesired substance from one side of the sealing arrangement to the other can be reliably prevented, restricted and/or minimized by the additional arrangement of a chamber for receiving a barrier medium between the seals. To defeat the entire sealing arrangement, the substance would have to also pass through the chamber with the barrier medium after penetrating the first seal ring. The barrier medium prevents, restricts and/or minimizes penetration in a variety of ways as a function of the embodiment of the present application. In one embodiment, the barrier medium can exhibit a positive pressure relative to that prevailing in the areas adjacent to the sealing arrangement, for example. This alone reliably prevents, restricts and/or minimizes the penetration of undesired substances into the sealing arrangement, since in the event of leaks in one of the two seals the barrier medium is forced through the seal and thus no undesired substance can penetrate through the seal.

In another embodiment, the barrier medium can also be at a lower-than-ambient pressure and connected to a reservoir via one or more ports. If a contaminant should enter the chamber through one seal, the contaminant is drawn into the reservoir and thus could not penetrate the sealing arrangement.

If a pressure monitor is provided in the chamber or a reservoir connected thereto, leaks can be detected in a timely manner in both cases, as either a drop or increase in pressure in the chamber with the barrier medium would occur and can be measured in the event of a leak at one of the two seals.

Possible barrier media are liquids or gases that, depending on the application, could have sterilizing properties so that, in cleanroom applications, any germs that penetrate the chamber are killed immediately or substantially immediately to prevent, restrict, and/or minimize contamination of the cleanroom with biologically active substances.

With a rotary distributor according to the present application, sealing arrangements according to the present application are provided between the individual distribution chambers. The distribution chambers are typically essentially annular, arranged between the stationary and the rotary part of the rotary distributor and have a port to the outside on the stationary part, through which a liquid or gaseous substance is admitted to the annular space. This in turn has in the rotary part one or more tubular connections to one or possibly both free ends of the rotary part. In this manner, the substances admitted in the stationary part can be passed through the annular space to ports on the rotary part, from where they are extracted. Of course, transport can also occur in the opposite direction. In many applications, such a rotary distributor is used to pass a plurality of different substances from the stationary to the rotary part of the distributor. To this end, multiple annular chambers are arranged adjacent to one another in the axial direction, and each is provided with one or more connectors on the stationary side and the rotary part. For reasons of space, these are mostly arranged in the form of a star around the distributor. At least one sealing arrangement according to the present application is provided between the annular spaces of the distributor to seal these from one another. This can reliably prevent, restrict, and/or minimize substances passing from one annular space to another and thus the mixing of the respective substances.

In one embodiment, two or more sealing arrangements can be provided between two annular distribution chambers, between which sealing arrangements an additional empty chamber is provided, which in this embodiment can also be connected to the outside. This allows for the timely detection of leaks, since some of the barrier medium or a mixture of barrier medium and the substance in the adjacent distribution chamber can penetrate the empty space and be detected via the port to the outside.

In another embodiment of the rotary distributor according to the present application, all or some of the chambers with the barrier medium can be interconnected and thus share inlets and outlets for the barrier medium to reduce the number of connectors. Even if different barrier media is used in different sections of the sealing arrangement, at least some of the chambers can be interconnected.

These and other possible embodiments of the present application are described below.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail below with reference to the attached drawings, in which:

FIG. 1C is a horizontal projection of a plant for the aseptic bottling that is similar to the plant illustrated in FIG. 1A;

DESCRIPTION OF EMBODIMENT OR EMBODIMENTS

Figure 1A:
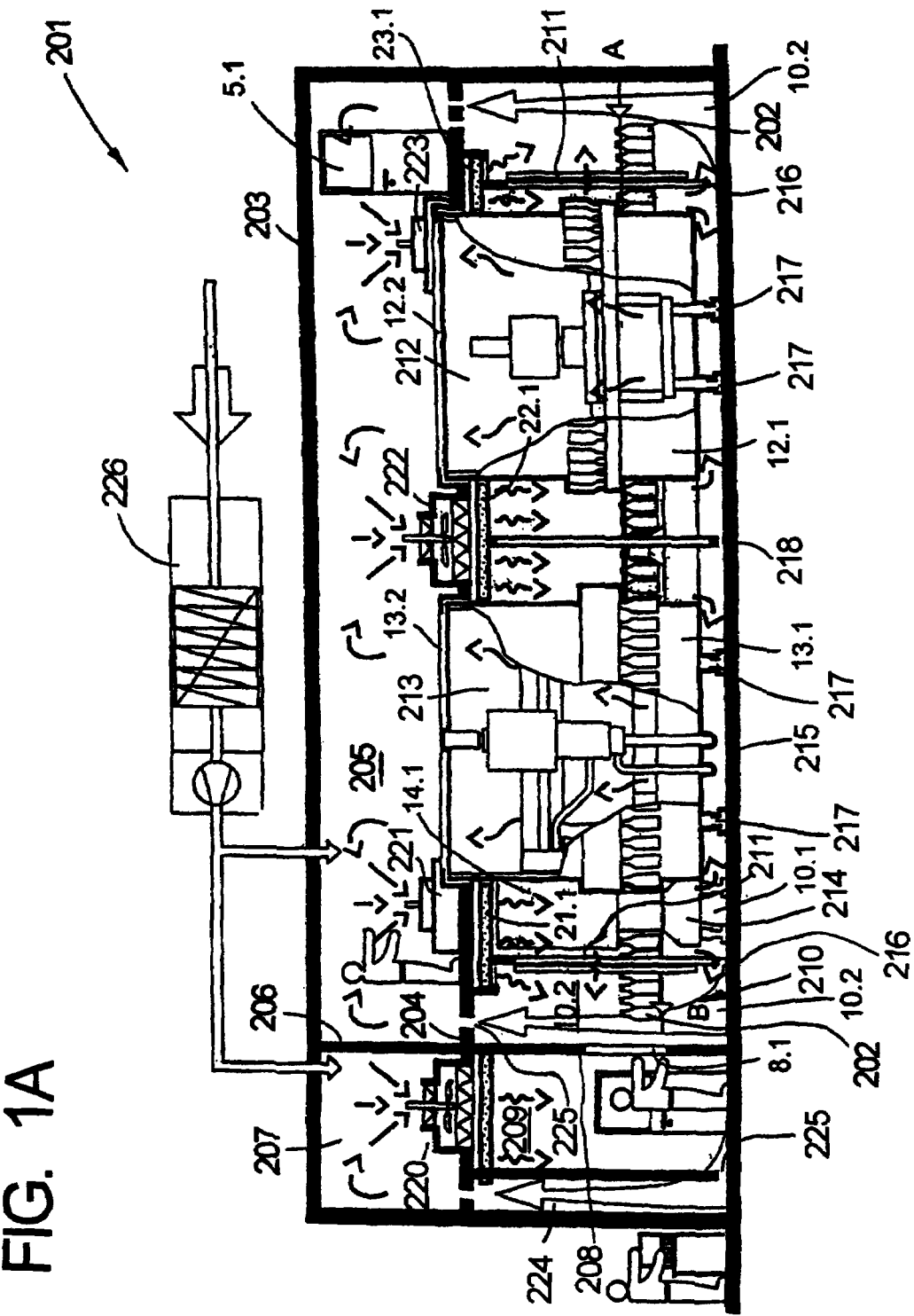
FIG. 1A is a simplified view in elevation of a plant for the aseptic bottling of a liquid in bottles or similar containers.
Figure 1B:
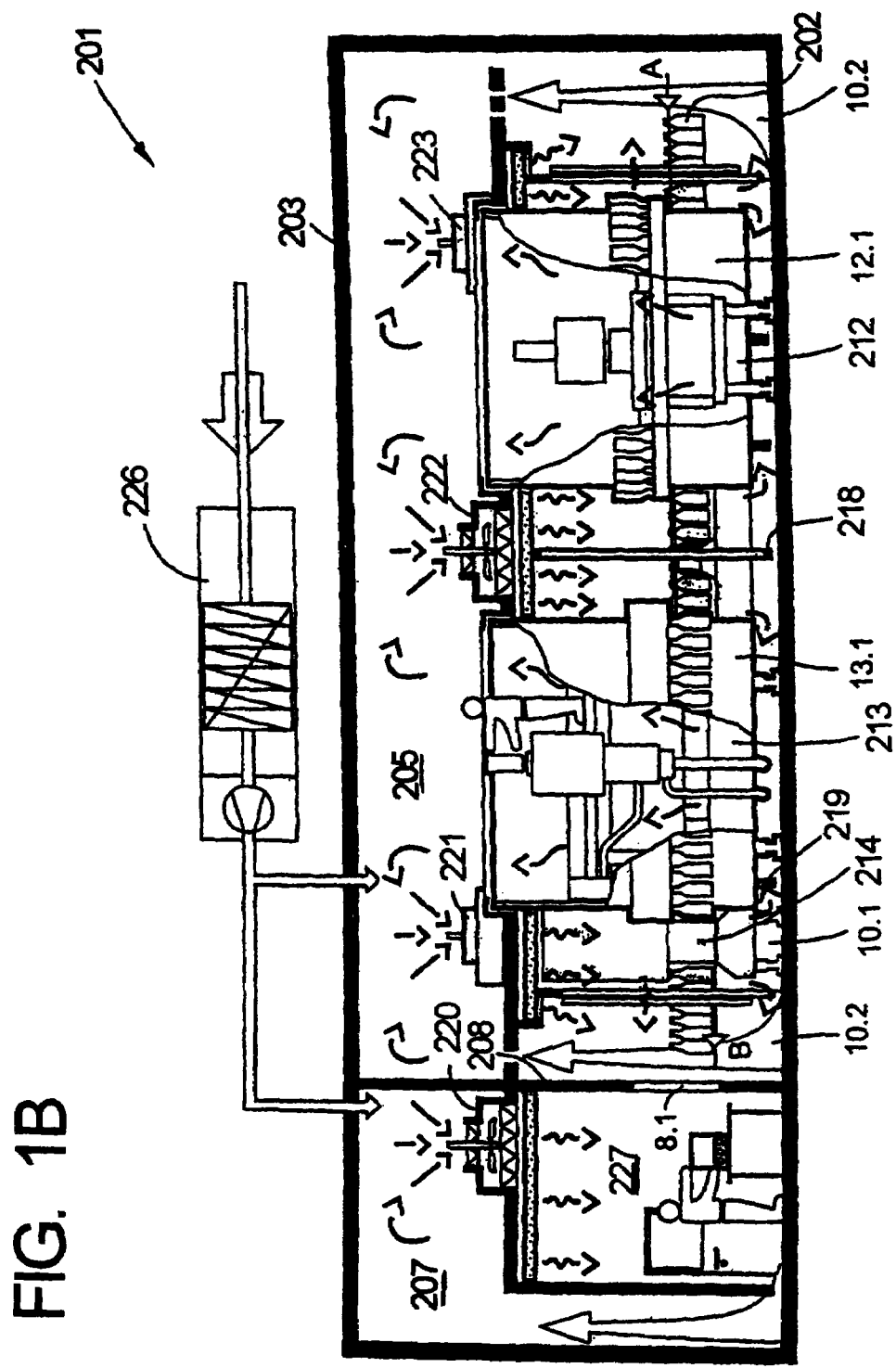
FIG. 1B is a simplified view in elevation of the plant illustrated in FIG. 1A, but in a different sectional plane.

The plant designated 201 in general in FIGS. 1A-1C is used for the aseptic bottling of a liquid in containers or bottles under clean room conditions, for example of a sensitive and/or highly perishable liquid such as a milk product, fruit juice or similar product, for example, or for the bottling of pharmaceutical products.

Please note that reference numeral 204 is referred to as both a "false floor" and a "false ceiling." To clarify, reference numeral 204 is referred to as a "false floor" when the upper portion of the below described bottling plant is being referred to, that is, when reference numeral 204 acts essentially as a floor. In contrast, reference numeral 204 is referred to as a "false ceiling" when the lower portion of the below described bottling plant is being referred to, that is, when reference numeral 204 acts essentially as a ceiling.

The plant 201 comprises essentially an outer housing 203 which encloses an interior which is essentially tightly closed from the exterior, and which is divided into an upper area and a lower area by an accessible false floor 204 (false ceiling). The upper area forms, over the larger portion of the horizontal projection in FIG. 1A, a plenum 205 (ceiling space or intermediate room) with access door 5.1 and an auxiliary room 207 which is separated from said plenum 205 by a vertical partition 206. Both the plenum 205 and the auxiliary room 207 are tall enough that said rooms can be entered by persons standing upright, e.g. to perform repair or maintenance work.

The space below the false floor 204 is divided by vertical walls 208 with sealed windows 8.1 into, among other things, a personnel entry airlock 209 and a sterile space 210, which in the plant illustrated in FIG. 1A is located below the plenum 205. For its part, the sterile room 210 is in turn divided by a partition or insulating wall 211 that encloses the machines used in the plant 201 into an inner clean room area 10.1 and an outer security area 10.2.

The partition or insulating wall 211 is realized, at least in part, in the form of a glass wall, so that the machines that are installed in the clean room segment 10.1 are visible from the security area 10.2, and thus the proper operation of these machines, among other things, can be observed.

In the illustrated embodiment, in the clean room area 10.1 there are a rinser 212 which, among other things, sterilizes the bottles 202 that have already been cleaned, a filling machine 213 to fill the sterilized bottles 202 with the liquid to be bottled, a capper 214 to close the bottles and transport devices to transport the bottles 202 between the rinser 212, the filling machine 213 and the capper 214. The rinser 212, the filling machine 213 and the capper 214 are all machines with a rotary design and a rotating rotor.

The empty bottles 202 are fed in the direction indicated by the Arrow A in FIGS. 1A-1C by means of a conveyor over the security area 10.2 and through an opening or lock in the wall 211 to the rinser 212. The filled and capped bottles are transported away in the direction indicated by the Arrow B in FIGS. 1A-1C by means of the conveyor through an opening or airlock in the wall 211, first into the security area 10.2 and from there out of the housing 203.

The wall 211 hermetically seals the clean room area 10.1, including the vicinity of the underside of the false floor 204, off from the security area. In the vicinity of the floor 215, there are openings 216 in the wall 211 for the passage of air from the clean room area 10.1 into the security area 10.2.

The rinser 212 and the filling machine 213 each have a shield wall or cylindrical shield 12.1 or 13.1 that enclose the respective machine and/or its rotor. These shields are each essentially in the shape of a hollow cylinder that lies with its axis equi-axial with the vertical machine axis and is open on the bottom and top of the machine. Because the machines generally stand on the floor 215 with feet 217, the lower edge or the bottom opening of each shield 12.1 or 13.1 is at some distance from the floor 215, so that between the floor and the lower edge of each shield 12.1 and 13.1 there is a ring-shaped opening for the entry of air from the space surrounding the respective machine into the interior of the shield 12.1 or 13.1. In the vicinity of the upper end, the shields 12.1 and 13.1 are connected in a sealed manner through the false floor 204, where they are covered by a grid or screen 12.2 or 13.2, for example, so that although air can flow out of the interior of the respective cover 12.1 or 13.1 into the plenum 205, the false floor 204 is still accessible in the area of the shields 12.1 and 13.1.

In one possible embodiment, the cylindrical shields 12.1 and 13.1 can extend all the way to, and possibly beyond, the false ceiling 204. Such a design essentially encloses the annular space above the rinser and the filling machine, thus minimizing the space of the clean room where sterile air is continuously introduced or flows. Further, the cylindrical shields 12.1 and 13.1 minimize or substantially reduce the size of the clean room area where sterile air is continuously introduced or flows. Without the shields 12.1 and 13.1, sterile air would occupy a substantially larger area of the clean room, which would result in more work from the filters 221, 222, and 223 and the distribution ducts 21.1, 22.1, and 23.1. A smaller area to fill with sterile air would result in lower energy use, lower costs, and less wear and tear on the filters and distribution ducts, possibly resulting in fewer repairs and less maintenance work.

The extension of the cylindrical shields 12.1 and 13.1 to or beyond the false ceiling 204 permits access to the machines inside the shields for maintenance or repair purposes. Further, since the cylindrical shields 12.1 and 13.1 sit off the floor and create a ring-shaped space around their respective machines, sterile air is permitted to flow from the clean room area surrounding the shields 12.1 and 13.1, through the ring-shaped space. The air then moves upward into the inside of the shields, then out through vents in the false ceiling 204. This upward flow of sterile air permits repairs or maintenance to be performed to the machines on the inside of the shields 12.1 and 13.1 without contaminating the sterile air in the clean room.

The cylindrical shields 12.1 and 13.1 also protect the sterile air in the clean room area from contaminates which may be generated from the rinser or filling machine. Since the rinser and filling machine operate within the confines of the shields 12.1 and 13.1, and the air inside the shields flows up and out through a vent in the false ceiling 204, most all of the airborne contaminates generated by the machines flow out and away from the sterile environment. The machines are effectively substantially sealed off from the clean room area, and any contaminates produced during the machines' operation are essentially kept from entering the clean room area and contaminating the sterilized air therein.

In the clean room area 10.1 there are additional partitions 218 and 219. The partition 218 is between the rinser 212 and the filling machine 213, and the partition 219 is between the filling machine 213 and the capper 214. In the illustrated embodiment, the partitions each form air passage openings on the floor 215. They also have openings to make possible the transfer of bottles between the individual sections.

In the false floor 204 there are a plurality of filtering devices 220-223 to produce sterile air by filtering. The filtering devices 220-223 are used not only for filtering, but can also be used to heat or cool the air. In addition to a filter and a fan, in such an application there can also be a heating or cooling element that is formed by a heat exchanger.

By means of the filtering device 220, air is sucked out of the auxiliary space 207 and filtered, i.e. it is introduced into the personnel entry airlock 209 in the form of sterile air. In the vicinity of the bottom 215, the personnel entry airlock 209 has an air outlet opening that empties into a vertical air duct 224, by means of which the air can flow out of the personnel entry airlock 209 back into the auxiliary room 207.

With the filter device 221, air is sucked out of the plenum 205 and filtered, i.e. the greater part of it is blown in the form of sterile air into the portion of the clean room area 10.1 that is occupied by the capper 214, and partly also into a hollow cylindrical shield 14.1 of the capper 214, so that the working and capping area of the capper receive a constant flow of with sterile air. A small portion of the filtered sterile air supplied by the filter device 221 gets into the security area 10.2.

From the filtering device 222, air is sucked out of the plenum 205 and introduced filtered in equal parts on both sides of the partition 218, i.e. in the form of sterile air into the portion of the clean room area 10.1 occupied by the rinser 212 and into the area occupied by the filling machine 213. The filtering device 223 also sucks air out of the plenum 205 and introduces it into the portion of the clean room area 10.1 occupied by the rinser 212, and so that at least a portion of the airflow generated by the filtering device 223 flows downward along the inside of the partition 211, and thereby also forms an air curtain at the airlock opening, at which the bottles 202 to be filled are transported in the upright position from the security area 10.2 into the clean room area 10.1 or to the rinser 212. A similar air curtain of filtered and sterile air is also formed at the airlock opening, at which the filled and capped bottles 202 travel out of the clean room area 10.1 into the security area 10.2.

As illustrated by the arrow that represents the airflow, the majority of the airflow generated by the filtering devices 221-223 flows upward via the interior of the shields 12.1 and 13.1 and then returns to the plenum 205 at the top of the respective shield. A portion of the airflow generated by the filtering devices 221-223 also flows through the openings 216 out of the clean room area 10.1 into the security area 10.2 and, like the sterile air from the filtering device 221, is introduced directly into the security area 10.2 and flows back into the plenum 205 via ventilation openings provided in the false floor 204.

In another possible embodiment, a portion of the airflow generated by the filtering devices 221-223 also flows through the openings 216 out of the clean room area 10.1 into the security area 10.2 and, like the sterile air introduced directly into the security area 10.2 by the filtering device 221, flows back into the plenum 205 via at least one ventilation opening provided in the false floor 204.

In the embodiment illustrated, the filtering devices 221, 222 and 223 have distribution ducts 21.1, 22.1 and 23.1 respectively for air distribution on the underside of the false floor 204.

In FIG. 1A, 226 is an external air-conditioning unit which, among other things, has a filter stage and an air-conditioning stage, and by means of which the plenum 205 and the auxiliary space 207 are supplied with filtered and air-conditioned fresh air.

The air-conditioning unit 226 as well as the individual filtering devices 220, 221, 222 and 223 are regulated so that the air pressure in the sterile space 210 is in any case higher than atmosphere pressure, and higher than the air pressure in the additional rooms adjacent to the sterile room 210, such as the plenum 205, the auxiliary room 207, the personnel entry airlock 209 etc. The external air-conditioning unit 226 and the filtering devices 220 are also regulated so that the pressure in the plenum 205, in the auxiliary room 207 and in the personnel entry airlock 209 and in the rooms adjacent to them is above the atmospheric pressure outside the housing 203. The air-conditioning unit 226 compensates for the air losses that occur on account of, among other things, the openings for the introduction and removal of containers and caps into and from the clean room.

The plant 201 is designed so that in the clean room 10.1, Clean Room Class 100 (approximately 3,500 particles per m$^3$ of air) is achieved. The sterile space 210 itself has a relatively small volume, which significantly reduces, among other things, the costs for air conditioning and air treatment. Also, in the event of any operational interruptions, the interiors of the shields 12.1 and 13.2 are accessible, i.e. repair and maintenance interventions can be carried out on the rinser 212 and on the filling machine 213, and namely via the upper cover 12.2 or 13.2 from the plenum 205. Because of the routing of the airflow out of the areas surrounding the rinser 212 and the filling machine 213 upward through the shields 12.1 and 13.1, in the space 210 outside the shields, i.e. in the sterile area itself, the conditions of Clean Room Class 100 can be maintained even during repairs and maintenance operations on the rinser 212 and on the filling machine 213.

FIG. 1B shows the plant illustrated in FIG. 1A in a modified view in elevation. This figure also shows a working or waiting room 227 for the operating personnel. This room 227, which is also supplied with filtered, sterile air via a filtering device 220 from the auxiliary space 207, is accessible via the personnel entry airlock 209. The room 210 can be reached if necessary from the room 227 or via a corresponding door. In the partition 208 which also separates the room 227 from the room 210, there is also at least one view window 8.1.

FIG. 1C shows, in a somewhat modified form, the horizontal projection of the plant. The security area 10.2 does not completely enclose the clean room area 10.1, but this security area 10.2 is adjacent only to a smaller part of the periphery of the clean room area 10.1, i.e. the wall 211 that encloses the clean room area 10.2 not only forms a partition between the security area 10.2 and the clean room area 10.1, but over the greater part of its length directly seals the clean room area 10.1 off from the environment. This configuration makes a significant contribution to minimize the volume of the space that is to be supplied with sterile and controlled-temperature air, which in turns minimizes operating costs.

As shown in FIG. 1C, in this realization the secure area 10.2 has a horizontal projection that comprises a plurality of Z or zig-zag shapes and comprises a plurality of segments 10.2.1-10.2.4, each of which is adjacent to another at right angles, whereby the inlet for the bottles 202 is provided in the segment 10.2.1 and the outlet for the filled bottles is provided in the segment 10.2.4, and the conveyor devices (Arrows A and B) for the bottles 202 run at a right angle to each other at the inlet and the outlet.

FIG. 1C further shows the relation of the wall 211 to the cylindrical shields 12.1 and 13.1. In this embodiment, the wall 211 essentially substantially outlines the outer edges of the shields 12.1 and 13.1 of the rinser 212 and the filling machine 213 in order to reduce the amount of open space in the clean room area 10.1. The wall 211 essentially forms a substantially polygonal shape around the outer edges of the shields 12.1 and 13.1. Please note that any number of sides may possibly be used to form the essentially polygonal outline of the shields 12.1 and 13.1. Further, the wall 211 may be rounded around the edges of the shields 12.1 and 13.1 instead of having a polygonal shape. The embodiment of the wall 211 in FIG. 1C is not meant to limit the shape of the wall 211 in any way, as other shapes and embodiments of the wall 211 are possible.

Figure 1:
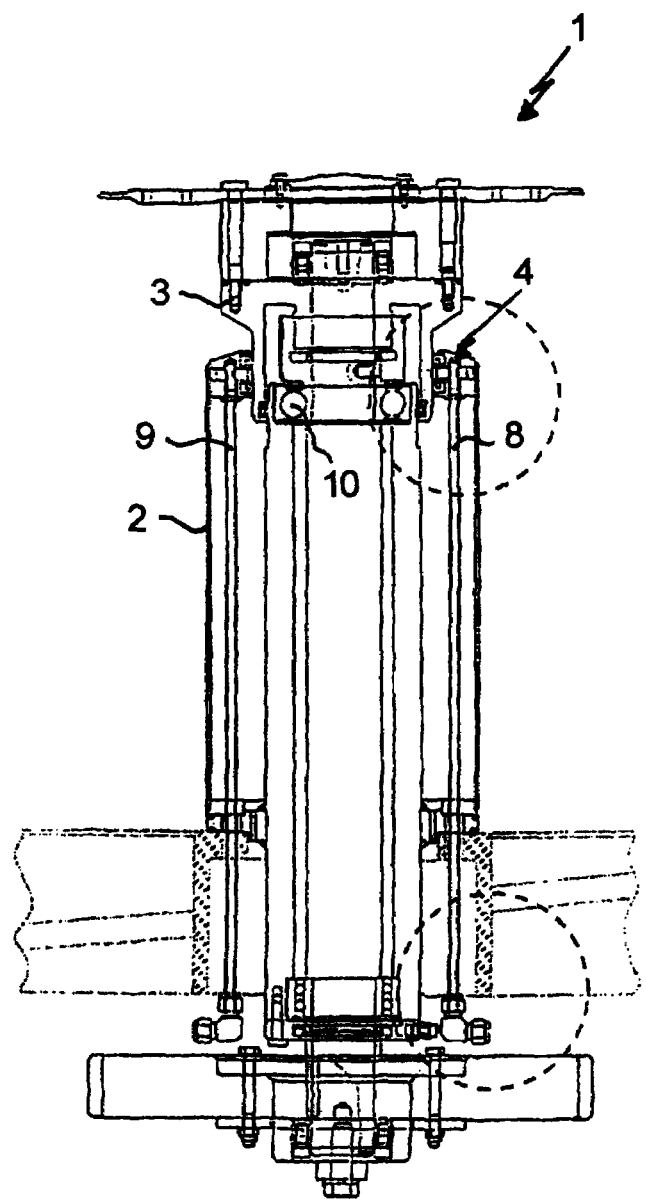
FIG. 1 shows a partial sectional side view of a rotary device with the sealing arrangement according to the present application.
Figure 2:
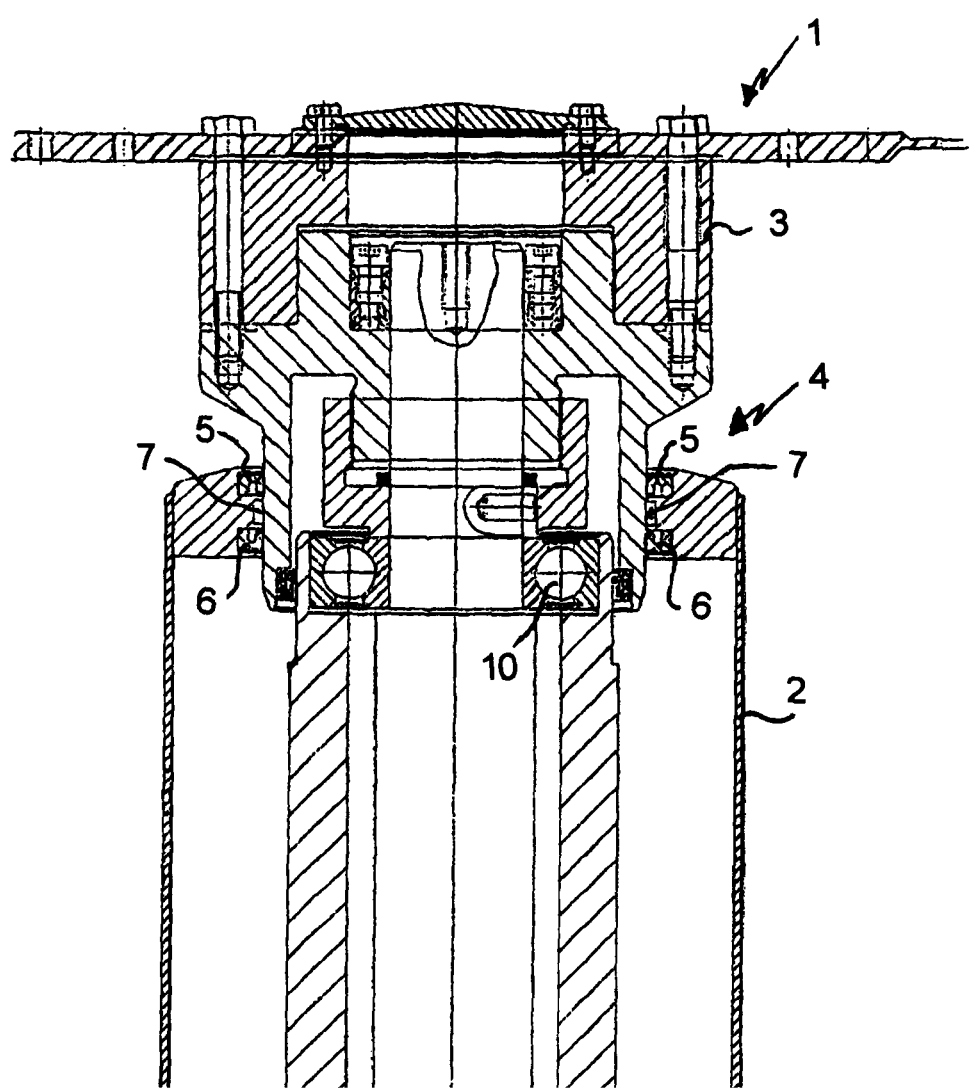
FIG. 2 shows an enlarged partial view in another sectional plane of the rotary device according to FIG. 1.

A pivot bearing device designated as a whole with 1 is shown in detail in FIG. 1. It has a stationary part 2 and a rotary part 3. The pivot bearing device 1 serves as a carrier for a container handling machine in an aseptic filling machine, for example. The rotary part 3 is turned by means of a drive unit not shown in greater detail. A sealing arrangement 4 according to the present application, which is shown in greater detail in FIG. 2, is arranged between the stationary part 2 and the rotary part 3.

Between the stationary part 2 and the rotary part 3, the sealing arrangement 4 according to the present application has a first seal 5 and second seal 6 in the form of seal rings that rest tightly against the rotary part 3.

Between the two seals 5 and 6 is an annular chamber 7, which comprises a barrier medium. This is admitted into the chamber 7 via an access line 8 and can drain from the chamber via a drain line 9, enabling circulation. Inlet 8 and outlet 9 are connected to a reservoir that forces the barrier medium, e.g. a fifteen percent solution of $H_2O_2$ solution, into the chamber under positive pressure and monitors the maintenance of this pressure. In the event of a leak at one of the two seals 5 or 6, a drop in pressure is detected and a corresponding maintenance signal is announced or generated.

This seal prevents, restricts, and/or minimizes the penetration of undesired substances, for example lubricants, from the bearing 10 into the area of the rotary part 3. This makes it possible to arrange this part in an aseptic environment, and the seal arrangement 4 prevents, restricts and/or minimizes the contamination or penetration of germs and such into this part of the machine. If one or both of the seals 5 or 6 should leak, the pressurized barrier medium in the chamber 7, which medium, as noted above, has sterilizing properties, at least prevents, restricts, and/or minimizes contamination with germs because firstly, these cannot pass through the sealing arrangement due to the pressurized barrier medium, and secondly, the germs are killed immediately or substantially immediately upon contact with the medium.

Figure 3:
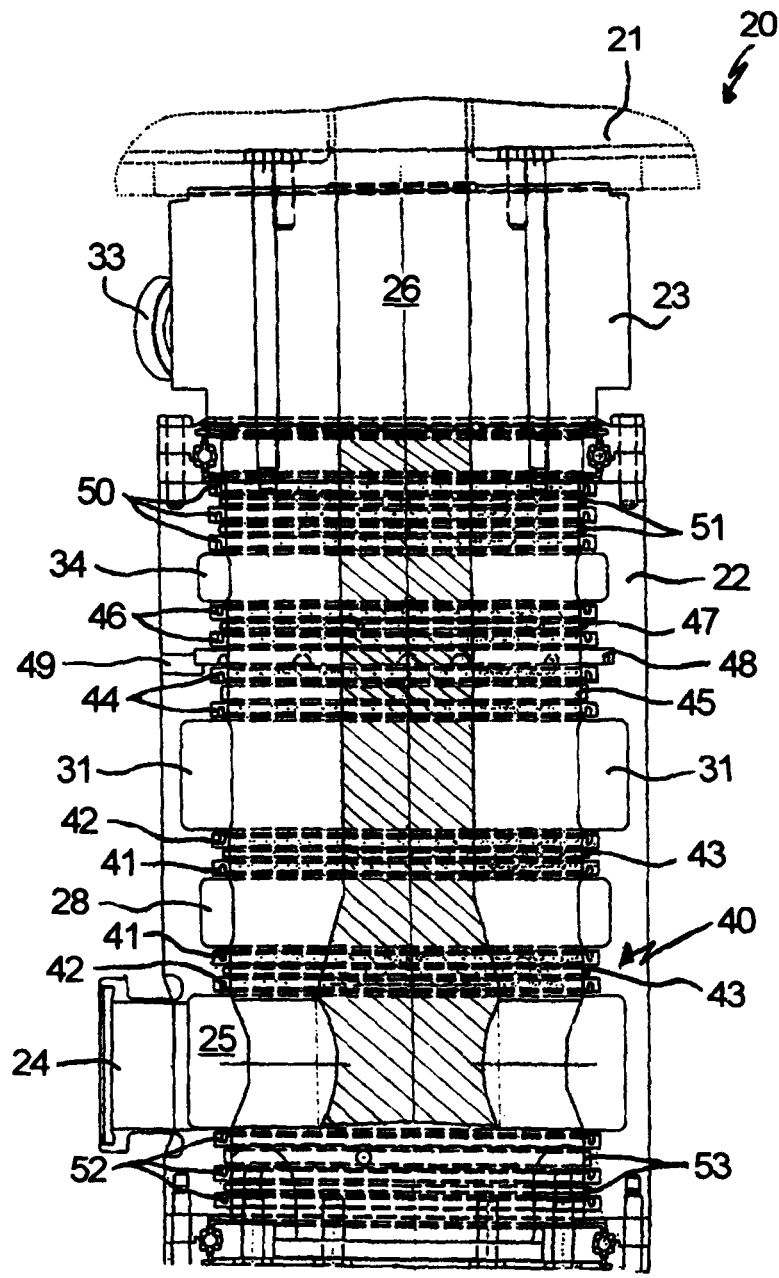
FIG. 3 shows a section through a rotary distributor according to the present application in a first sectional plane.
Figure 4:
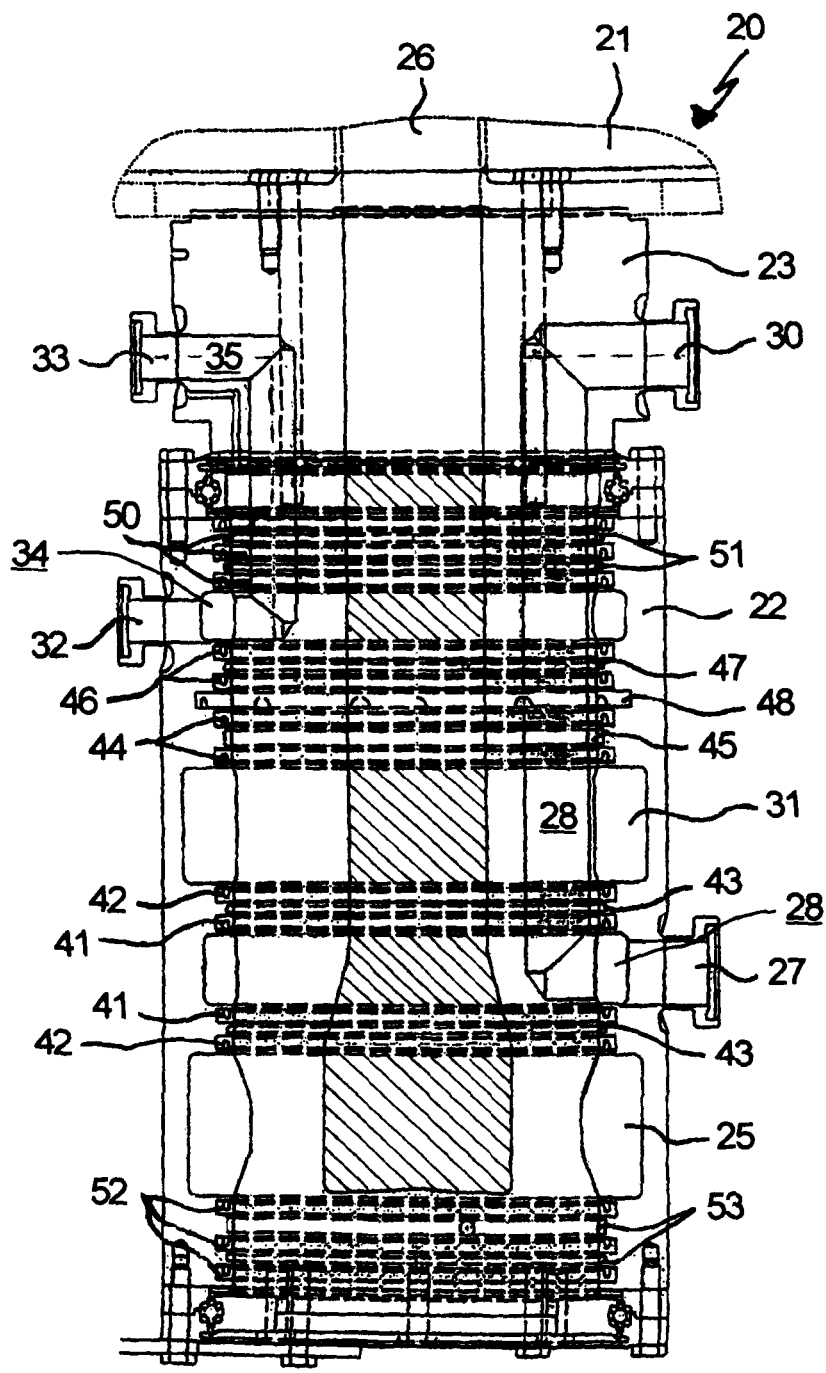
FIG. 4 shows a section through a rotary distributor according to the present application in a second sectional plane.
Figure 5:
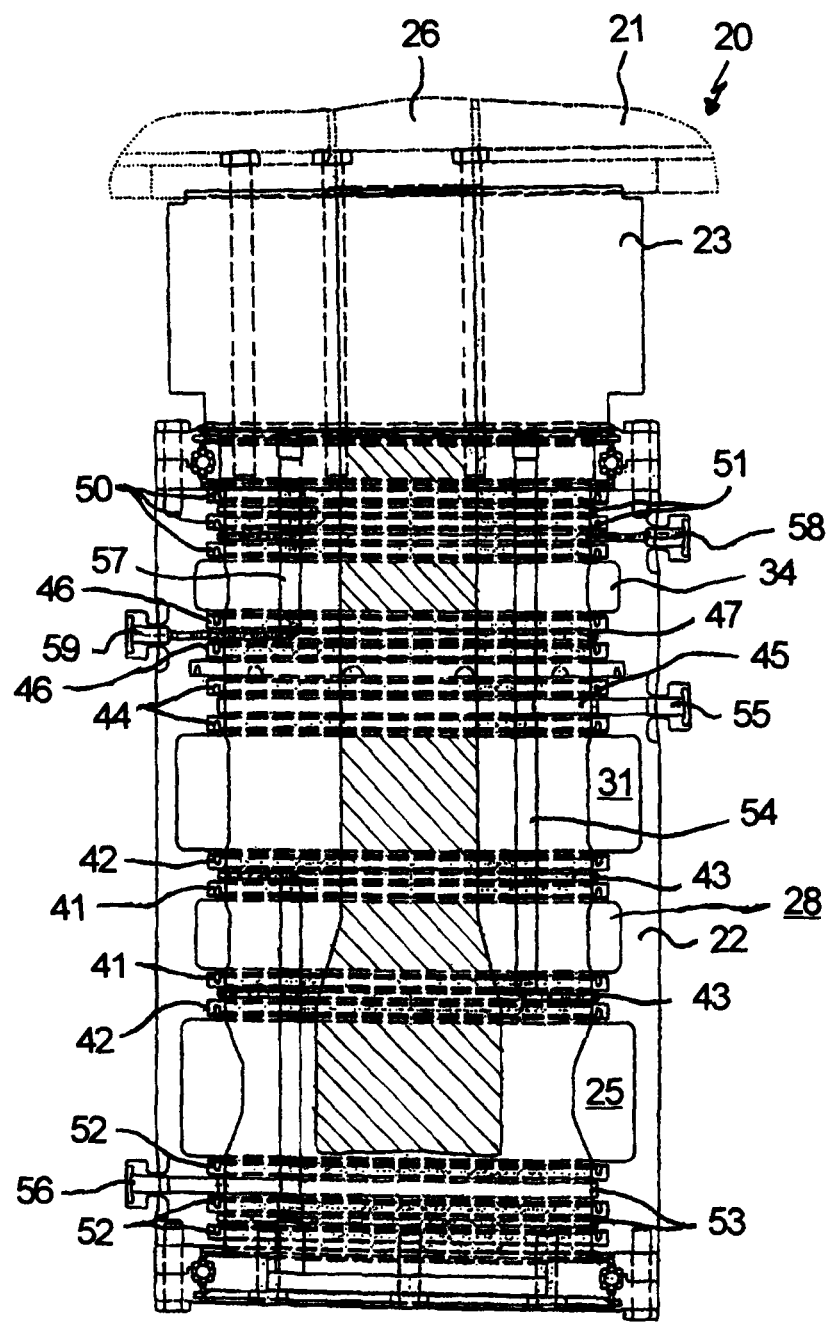
FIG. 5 shows a section through a rotary distributor according to FIG. 3 in a third sectional plane.
Figure 6:
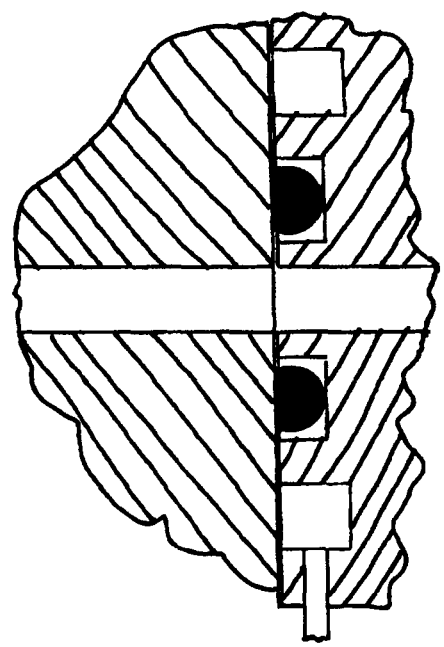
FIG. 6 shows an additional, independent embodiment of the present application.

A rotary distributor 20 according to the present application is shown in FIGS. 3 through 5. It is used in a beverage container filling machine, for example, which is not shown in greater detail. It also has a stationary part 22 and a rotary part 23. It serves both to carry the rotating base plate 21 of the filling machine and also passes the liquid and gaseous media from the stationary part of the machine to the rotary part.

The product is passed through the first connector 24 into an essentially annular space 25 arranged in the stationary part 22 and at the corresponding position in the rotary part 23 of the rotary distributor 20. Provided in the rotary part 23 of the distributor are multiple connections between the annular space 25 and the hollow center section 26 of the rotary part 23, so that the product in the annular space 25 can be passed through the interior of the rotary part 23 to the rotating filling stations, which are not shown here in greater detail.

Sterile air is passed in a similar manner via an additional connector 27 into an annular space 28 likewise arranged in the stationary and the corresponding rotary part. A tubular passage 29 is provided in the rotary part 23, which passage is connected to the annular space 28 on one side and a connector 30 in the upper section of the rotary part 3 on the other. Sterile air can also be passed from the stationary to the rotary part of the machine in this manner. An additional liquid is transferred analogously into the annular space 31 by means of connectors not shown in greater detail. An additional liquid, e.g. a cleaning foam or cleaning solution, is passed through the annular space 34 and the connecting line 35 via the connectors 32 and 33.

The sealing arrangements according to the present application are used between every two annular spaces, among other locations.

Arranged between the annular space 25 and the annular space 28 are a first seal 41 and a second seal 42, between which lies an annular chamber 43. Located in this annular chamber 43 is a barrier medium of fifteen percent $H_2O_2$ solution. The seals 41 and 42 are each designed so that their primary sealing action is with respect to the adjacent annular space, thus they prevent, restrict and/or minimize the contents of the two annular spaces from mixing. The sealing arrangement 40 between the annular space 28 and the annular space 31 is structured the same way.

To increase the reliability of the seal between the spaces 31 and 34, the sealing arrangement according to the present application is realized in duplicate here. Two seals 44 are provided to effect a seal in the direction of space 31 and between which there is a chamber 45 with the barrier medium. Two seals 46 are provided at annular space 34 to effect a seal in the direction of this space and between which there is likewise a chamber 47 with the barrier medium. Between these two double sealing arrangements is an empty space 48 that is accessible via a port 49. This provides enhanced reliability, since in the event of the failure of one of the seals, a portion of the barrier medium enters the interior of the empty space 48 and is drawn off to the outside via the ports 49. This enables the timely detection of a sealing arrangement malfunction, in one possible embodiment before the contents of the annular spaces 31 and 34 can intermix.

To seal the annular space 34 to the top, three seals 50 are provided, between which two chambers 51 with barrier medium 51 are arranged. Analogously, three seals 52 are arranged on the bottom of the arrangements, which seals likewise enclose between them two chambers 3 with barrier medium so that the chamber 25 is also reliably sealed. The chambers 43, 45 and 53 are interconnected via lines 54 in the rotating part 23 and accessible from the outside via connectors 55, 56. These can be used to add or remove barrier medium to/from the chambers 43, 45, 53. These can also be used to provide pressure control and monitoring functions, so that a positive pressure in the chambers can be developed, maintained and monitored to further enhance the reliability of the seal and at the same time facilitate detection in the event of leaks by means of the pressure drop. The chambers 47 and 51 are connected to one another via a separate line 57, which are accessible via connectors 58 and 59. This allows chamber 43 to be sealed with a different pressure, if necessary and/or desired, by using an alternative barrier medium.

The present application is not restricted to the possible embodiment above and can be modified in numerous ways without straying from the basic principle. In one possible embodiment, the type and design of the chamber connectors and the general structure of the rotary distributor or other rotary connections that are sealed using the sealing arrangement according to the present application can vary over a broad spectrum. The dimensions and material used can also vary broadly.

Furthermore, in an independent refinement of the present application, a sealing arrangement is configured for the sealed connection of at least two rigidly connected elements of an assembly, whereby at least one of these elements has a line for a fluid.

Furthermore, there is at least one sealing element for sealing the fluid line and/or the point of connection of the at least two elements against the environment, whereby a chamber (7, 43, 45, 47, 51, 53) for receiving leaked medium or a barrier medium is provided outside the interior space defined by the sealing element. As described above, this configuration allows the function of the sealing elements to be reliably and easily achieved and/or monitored by an inspection of the chambers (7, 43, 45, 47, 51, 53).

Figure 7:
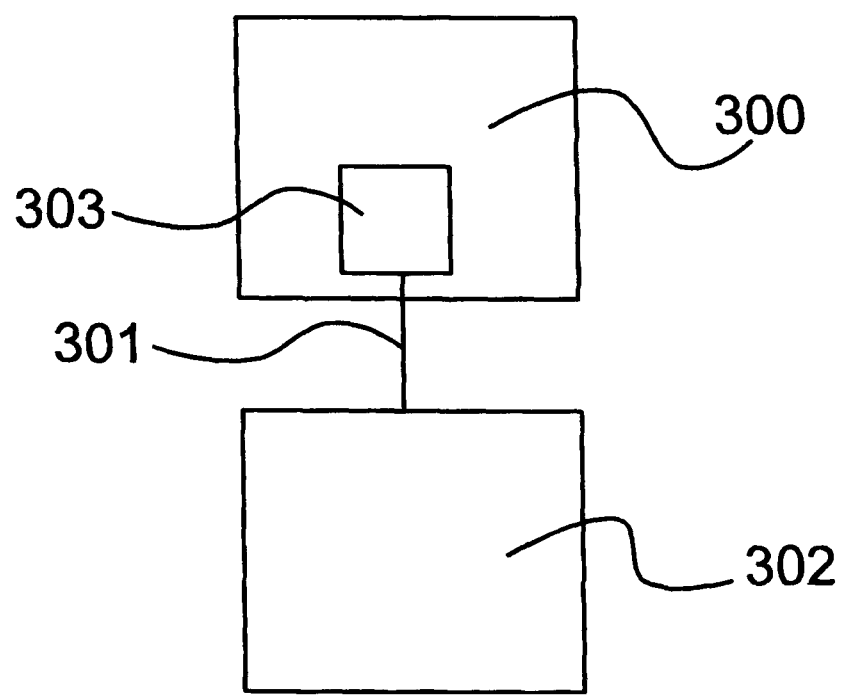
FIG. 7 shows a block diagram representing the rotary device and a portion of a clean room.

FIG. 7 shows a block diagram representing the rotary device and a portion of a clean room. In the embodiment shown in FIG. 7, a drive arrangement or device or unit 302 is connected via a rotatable bearing shaft arrangement 301 to a rotary portion 303 of a bottle or container handling machine, such as a filling or closing machine. The rotary portion 303 is located inside a clean room portion 300 to permit aseptic handling of bottles or containers. In one possible embodiment, the clean room portion 300 is sealed and the drive arrangement 302 is located outside of the sealed area. The rotatable bearing shaft arrangement 301 passes through a wall or floor surface of the sealed area and connects to the rotary portion 303 located therein. In another possible embodiment, a drive arrangement 302, the bearing arrangement 301, and the rotary portion 303 are all located inside a clean room. In such an embodiment, the drive arrangement 302 could be located inside a sealed housing to minimize movement of contaminants from the drive arrangement 302 into the clean room. Only the bearing arrangement 301 would project out of the housing to connect to the rotary portion 303. In either of these embodiments, a sealing arrangement such as is described herein could be utilized to minimize movement of contaminants from the drive arrangement 302 along the bearing arrangement 301 and into the clean room.

Figure 8:
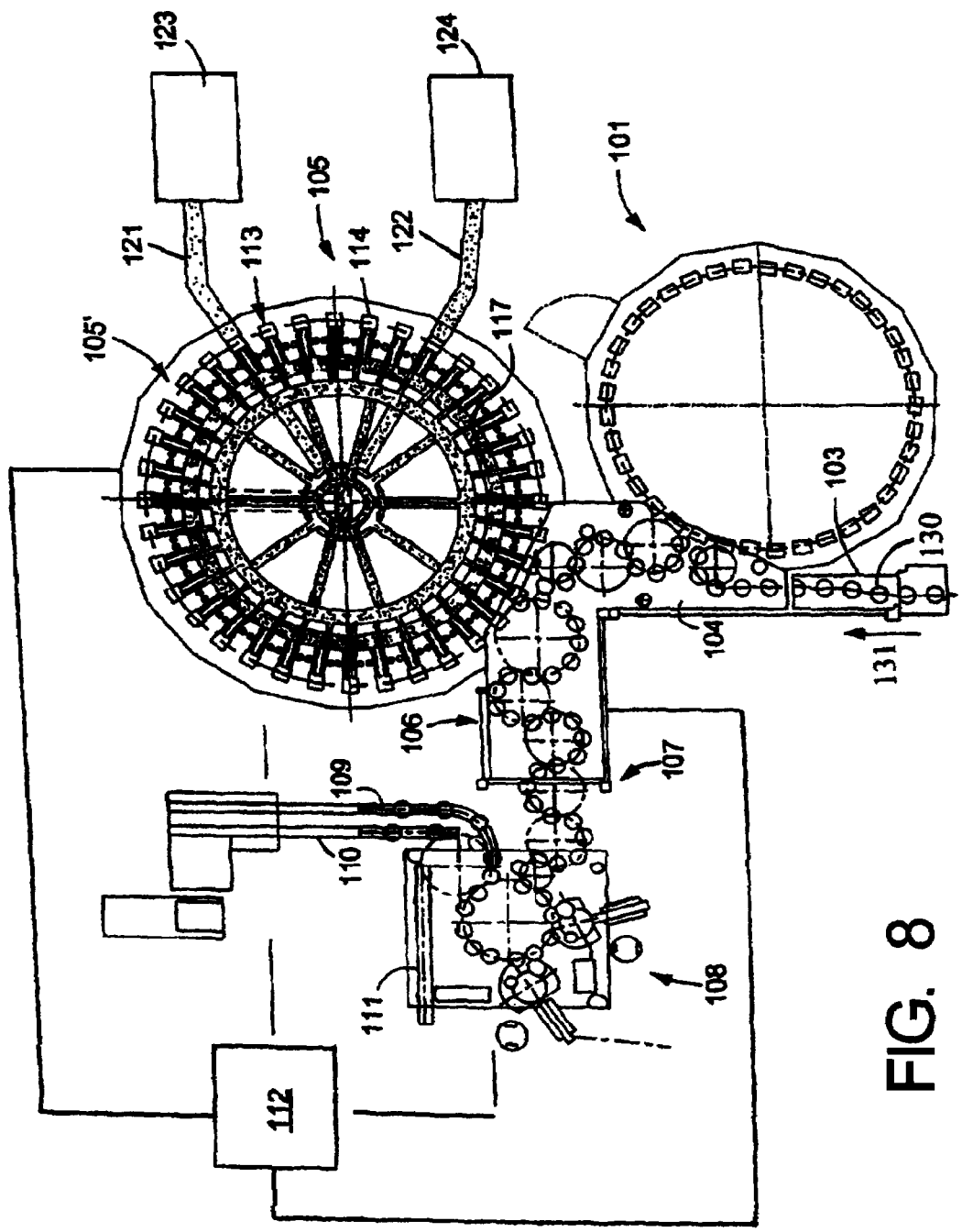
FIG. 8 shows schematically the main components of one possible embodiment example of a system for filling containers.

FIG. 8 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 8 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 8, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The object of the present application is to provide a sealing arrangement for a rotary device and a rotary distributor comprising a stationary and a rotary part that has a long service life and essentially ensures and/or promotes a reliable sealing function while also permitting early detection of possible leaks in the system.

To achieve this object, at least two interspaced seals 5, 6, 41, 42, 44, 46, 50, 52 are provided between the stationary 2, 22 and the rotary 3, 23 part, and between which seals a chamber 7, 43, 45, 47, 51, 53 for receiving a barrier medium is arranged.

One feature or aspect of an embodiment is believed at the time of the filing of this patent application to possibly reside broadly in a sealing arrangement for a pivot bearing device having a stationary and a rotary part, wherein between the stationary 2, 22 and the rotary 3, 23 part there are at least two interspaced seals 5, 6, 41, 42, 44, 46, 50, 52, between which a chamber 7, 43, 45, 47, 51, 53 for receiving a barrier medium is arranged.

Another feature or aspect of an embodiment is believed at the time of the filing of this patent application to possibly reside broadly in the sealing arrangement, wherein the chamber 7, 43, 45, 47, 51, 53 is essentially annular.

Yet another feature or aspect of an embodiment is believed at the time of the filing of this patent application to possibly reside broadly in the sealing arrangement, wherein the chamber 7, 43, 45, 47, 51, 53 has at least one inlet 8, 55, 56, 58, 59 from the outside.

Still another feature or aspect of an embodiment is believed at the time of the filing of this patent application to possibly reside broadly in the sealing arrangement, wherein the chamber 7, 43, 45, 47, 51, 53 is configured for the circulation of the barrier medium.

A further feature or aspect of an embodiment is believed at the time of the filing of this patent application to possibly reside broadly in the sealing arrangement, wherein in the event of multiple sealing arrangements 40, at least two chambers 7, 43, 45, 47, 51, 53 have a connection for the passage of the barrier medium.

Another feature or aspect of an embodiment is believed at the time of the filing of this patent application to possibly reside broadly in the sealing arrangement, wherein the chamber 7, 43, 45, 47, 51, 53 has a pressure monitor and/or a level monitor.

Yet another feature or aspect of an embodiment is believed at the time of the filing of this patent application to possibly reside broadly in a method according to the present application, wherein in the event of multiple sealing arrangements 40, there is an empty space 48 between them.

Still another feature or aspect of an embodiment is believed at the time of the filing of this patent application to possibly reside broadly in the sealing arrangement, wherein the barrier medium is liquid or gaseous.

A further feature or aspect of an embodiment is believed at the time of the filing of this patent application to possibly reside broadly in the sealing arrangement, wherein the barrier medium is a disinfectant solution.

One feature or aspect of an embodiment is believed at the time of the filing of this patent application to possibly reside broadly in a rotary distributor having at least one sealing arrangement according to the present application.

Another feature or aspect of an embodiment is believed at the time of the filing of this patent application to possibly reside broadly in the rotary distributor, wherein one sealing arrangement 40 is provided between every two annular spaces 25, 38, 31, 34.

Yet another feature or aspect of an embodiment is believed at the time of the filing of this patent application to possibly reside broadly in the sealing arrangement for the sealed connection of at least two rigidly connected elements of an assembly, whereby at least one of these elements has a line for a fluid and whereby there is at least one sealing element for sealing the fluid line against the environment, wherein a chamber 7, 43, 45, 47, 51, 53 for receiving leaking medium or a barrier medium is arranged outside the interior space defined by the sealing element.

One feature or aspect of an embodiment is believed at the time of the filing of this patent application to possibly reside broadly in a method of operating a rotary beverage bottle or container filling machine in an aseptic clean room in a beverage bottling or container filling plant and temporarily maintaining aseptic conditions in said clean room during operation of said rotary beverage bottle or container filling machine upon failure of a worn shaft seal until replacement of the worn shaft seal, said method comprising the steps of: rotating a rotor of said rotary beverage bottle or container filling machine by rotating a drive shaft connected to said rotor in a bearing arrangement comprising a pair of annular seals disposed about said drive shaft and a stationary portion disposed about and enclosing a portion of said drive shaft; feeding a disinfectant solution into an annular chamber which is disposed between said pair of annular seals, and which annular chamber is formed by an outer surface of said drive shaft and an annular recess in said stationary portion; filling said annular chamber with said disinfectant solution and maintaining a pressurized flow of said disinfectant solution into and out of said annular chamber; sealing off the interior of said stationary portion with said annular seals to prevent movement of microbiological substances from the interior of said stationary portion into said clean room during rotation of said drive shaft; continuing rotating said drive shaft and damaging or wearing said annular seals to a level of damage or wear sufficient to permit microbiological substances to move past said damaged or worn annular seals and into said annular chamber; continuing flowing said disinfectant solution in said annular chamber and destroying the microbiological substances therein to prevent the microbiological substances from moving into said clean room and contaminating said clean room until replacement of said damaged or worn annular seals is performed; and stopping rotation of said drive shaft and replacing said damaged or worn annular seals.

Another feature or aspect of an embodiment is believed at the time of the filing of this patent application to possibly reside broadly in the method, wherein: said bearing arrangement comprises a plurality of pairs of seals and a plurality of chambers, wherein one of said chambers is disposed between each pair of seals; and said seals comprise annular seals and said chambers comprise annular chambers.

Yet another feature or aspect of an embodiment is believed at the time of the filing of this patent application to possibly reside broadly in the method, wherein: said bearing arrangement comprises at least one inlet to permit the flow of disinfectant medium into said chambers; and said bearing arrangement comprises at least one outlet to permit the flow of disinfectant medium out of said chambers.

Still another feature or aspect of an embodiment is believed at the time of the filing of this patent application to possibly reside broadly in the method, wherein: at least one of said drive shaft and said stationary portion comprises passages configured and disposed to connect said chambers for the flow of disinfectant medium between said chambers; said bearing arrangement comprises at least one of: a pressure monitor to monitor the pressure in said chambers, a level monitor to monitor the level of hydrogen peroxide in said disinfectant medium in said chambers, and a flow monitor to monitor at least one of the inflow and outflow of disinfectant medium through said chambers.

A further feature or aspect of an embodiment is believed at the time of the filing of this patent application to possibly reside broadly in a means for performing the method, said means comprising: means for rotating a rotor of said rotary beverage bottle or container filling machine by rotating a drive shaft connected to said rotor in a bearing arrangement comprising a pair of annular seals disposed about said drive shaft and a stationary portion disposed about and enclosing a portion of said drive shaft; means for feeding a disinfectant solution into an annular chamber which is disposed between said pair of annular seals, and which annular chamber is formed by an outer surface of said drive shaft and an annular recess in said stationary portion; said means for feeding comprises means for filling said annular chamber with a disinfectant solution and maintaining a pressurized flow of a disinfectant solution into and out of said annular chamber; said annular seals comprise means for sealing off the interior of said stationary portion to prevent movement of microbiological substances from the interior of said stationary portion into said clean room during rotation of said drive shaft; said means for rotating comprises means for continuing rotating said drive shaft and damaging or wearing said annular seals to a level of damage or wear sufficient to permit microbiological substances to move past said damaged or worn annular seals and into said annular chamber; said means for feeding comprises means for continuing flowing a disinfectant solution in said annular chamber to destroy microbiological substances therein to prevent microbiological substances from moving into said clean room and contaminating said clean room until replacement of said damaged or worn annular seals is performed; and said means for rotating comprises means for stopping rotation of said drive shaft to permit replacement of said damaged or worn annular seals.

Another feature or aspect of an embodiment is believed at the time of the filing of this patent application to possibly reside broadly in an arrangement for performing the method, said arrangement comprising: a drive shaft being configured to be rotated to rotate a rotor of said rotary beverage bottle or container filling machine connected to said drive shaft, said drive shaft being disposed in a bearing arrangement comprising a pair of annular seals disposed about said drive shaft and a stationary portion disposed about and enclosing a portion of said drive shaft; a feeding arrangement being configured to feed a disinfectant solution into an annular chamber which is disposed between said pair of annular seals, and which annular chamber is formed by an outer surface of said drive shaft and an annular recess in said stationary portion; said feeding arrangement being configured to fill said annular chamber with a disinfectant solution and maintaining a pressurized flow of a disinfectant solution into and out of said annular chamber; said annular seals being configured to seal off the interior of said stationary portion to prevent movement of microbiological substances from the interior of said stationary portion into said clean room during rotation of said drive shaft; said drive shaft being configured to continue rotating and damaging or wearing said annular seals to a level of damage or wear sufficient to permit microbiological substances to move past said damaged or worn annular seals and into said annular chamber; said feeding arrangement being configured to continue flowing a disinfectant solution in said annular chamber to destroy microbiological substances therein to prevent microbiological substances from moving into said clean room and contaminating said clean room until replacement of said damaged or worn annular seals is performed; and said drive shaft being configured to be stopped to permit replacement of said damaged or worn annular seals.

Yet another feature or aspect of an embodiment is believed at the time of the filing of this patent application to possibly reside broadly in a method of operating a container handling machine in an aseptic clean room in a container handling plant, said method comprising the steps of: rotating a rotor of said container handling machine by rotating a drive shaft connected to said rotor in a bearing arrangement comprising a seal disposed about said drive shaft and a stationary portion disposed about and enclosing a portion of said drive shaft; feeding a disinfectant medium into a chamber which is disposed about said drive shaft between said clean room and said seal, and which chamber is formed by an outer surface of said drive shaft and an inner surface of said stationary portion; and filling said chamber with said disinfectant medium and maintaining a pressurized flow of said disinfectant medium into and out of said chamber, and destroying microbiological substances therein upon the microbiological substances moving past said seal and toward said clean room to minimize contamination of said clean room during rotation of said drive shaft and operation of said handling machine.

Still another feature or aspect of an embodiment is believed at the time of the filing of this patent application to possibly reside broadly in a method, wherein said disinfectant medium comprises at least one of: a liquid medium or a gaseous medium.

A further feature or aspect of an embodiment is believed at the time of the filing of this patent application to possibly reside broadly in a method, wherein: said disinfectant medium comprises hydrogen peroxide; and said bearing arrangement comprises another seal disposed between said clean room and said chamber.

Another feature or aspect of an embodiment is believed at the time of the filing of this patent application to possibly reside broadly in a means for performing the method, said means comprising: means for rotating a rotor of said container handling machine by rotating a drive shaft connected to said rotor in a bearing arrangement comprising a seal disposed about said drive shaft and a stationary portion disposed about and enclosing a portion of said drive shaft; means for feeding a disinfectant medium into a chamber which is disposed about said drive shaft between said clean room and said seal, and which chamber is formed by an outer surface of said drive shaft and an inner surface of said stationary portion; and said means for feeding comprises means for filling said chamber with a disinfectant medium and also for maintaining a pressurized flow of a disinfectant medium into and out of said chamber to destroy microbiological substances therein upon microbiological substances moving past said seal and toward said clean room to minimize contamination of said clean room during rotation of said drive shaft and operation of said handling machine.

Yet another feature or aspect of an embodiment is believed at the time of the filing of this patent application to possibly reside broadly in an arrangement for performing the method, said arrangement comprising: a drive shaft being configured to be rotated to rotate a rotor of said container handling machine connected to said drive shaft, said drive shaft being disposed in a bearing arrangement comprising a seal disposed about said drive shaft and a stationary portion disposed about and enclosing a portion of said drive shaft; a feed arrangement being configured to feed a disinfectant medium into a chamber which is disposed about said drive shaft between said clean room and said seal, and which chamber is formed by an outer surface of said drive shaft and an inner surface of said stationary portion; and said feed arrangement being configured to fill said chamber with a disinfectant medium and being configured to maintain a pressurized flow of a disinfectant medium into and out of said chamber to destroy microbiological substances therein upon microbiological substances moving past said seal and toward said clean room to minimize contamination of said clean room during rotation of said drive shaft and operation of said handling machine.

Still another feature or aspect of an embodiment is believed at the time of the filing of this patent application to possibly reside broadly in an arrangement, wherein said feed arrangement is configured to fill said chamber with at least one of: a liquid disinfectant medium or a gaseous disinfectant medium.

A further feature or aspect of an embodiment is believed at the time of the filing of this patent application to possibly reside broadly in an arrangement, wherein: said feed arrangement is configured to fill said chamber with a disinfectant medium comprising hydrogen peroxide; and said bearing arrangement comprises another seal disposed between said clean room and said chamber.

Another feature or aspect of an embodiment is believed at the time of the filing of this patent application to possibly reside broadly in an arrangement, wherein: said bearing arrangement comprises a plurality of pairs of seals and a plurality of chambers, wherein one of said chambers is disposed between each pair of seals; and said seals comprise annular seals and said chambers comprise annular chambers.

Yet another feature or aspect of an embodiment is believed at the time of the filing of this patent application to possibly reside broadly in an arrangement, wherein: said bearing arrangement comprises at least one inlet to permit the flow of disinfectant medium into said chambers; and said bearing arrangement comprises at least one outlet to permit the flow of disinfectant medium out of said chambers.

A further feature or aspect of an embodiment is believed at the time of the filing of this patent application to possibly reside broadly in an arrangement, wherein: at least one of said drive shaft and said stationary portion comprises passages configured and disposed to connect said chambers for the flow of disinfectant medium between said chambers; said bearing arrangement comprises at least one of: a pressure monitor to monitor the pressure in said chambers, a level monitor to monitor the level of hydrogen peroxide in disinfectant medium in said chambers, and a flow monitor to monitor at least one of the inflow and outflow of disinfectant medium through said chambers.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of clean rooms and components or systems related to clean rooms that may possibly be utilized or adapted for use in at least one possible embodiment may possibly be found in the following U.S. Pat. No. 7,468,084, entitled "Device for conditioning recirculating air, especially clean room air"; U.S. Pat. No. 7,465,225, entitled "Clean room unit"; U.S. Pat. No. 7,083,515, entitled "Clean room facility and construction method"; U.S. Pat. No. 6,960,236, entitled "Clean room"; U.S. Pat. No. 6,955,595, entitled "Clean room system"; U.S. Pat. No. 6,929,985, entitled "Air filter, method of manufacturing air filter, local facility, clean room, treating agent, and method of manufacturing filter medium"; U.S. Pat. No. 6,867,682, entitled "Clean room system"; U.S. Pat. No. 6,612,084, entitled "Clean room and method"; U.S. Pat. No. 6,607,435, entitled "Fan filter unit control system and clean room provided with same"; U.S. Pat. No. 6,574,937, entitled "Clean room and method"; U.S. Pat. No. 6,572,468, entitled "Clean room device"; U.S. Pat. No. 6,514,137, entitled "Modular clean room plenum"; U.S. Pat. No. 6,390,755, entitled "Exhaust device for use in a clean room, cleanroom, and method"; U.S. Pat. No. 6,306,189, entitled "Clean room." Another example of clean rooms and components or systems related to clean rooms that may possibly be utilized or adapted for use in at least one possible embodiment may possibly be found in U.S. patent application Ser. No. 11/050,484, filed Feb. 3, 2005, published as U.S. publication US-2005-0188651-A1 on Sep. 1, 2005, which documents are incorporated by reference as if set forth in their entirety herein.

Some examples of aseptic filling systems or plants and components thereof that may possibly be utilized or adapted for use in at least one possible embodiment may possibly be found in the following U.S. Pat. No. 7,404,276, entitled "Beverage bottling plant for aseptic filling of beverage bottles with a liquid beverage filling material"; U.S. Pat. No. 7,373,959, entitled "Apparatus and method for aseptic serial filling of containers"; U.S. Pat. No. 7,341,079, entitled "Machine for the aseptic treatment of containers in bottling plant"; U.S. Pat. No. 7,217,033, entitled "Aseptic packaging for foods and systems and methods for aseptically packaging foods"; U.S. Pat. No. 7,029,734, entitled "Packaging film, package and process for aseptic packaging"; U.S. Pat. No. 6,945,013, entitled "Method and apparatus for aseptic packaging"; U.S. Pat. No. 6,796,108, entitled "Method and apparatus for controlling the filling of containers under aseptic conditions"; U.S. Pat. No. 6,755,224, entitled "Aseptic filling apparatus of the rotary type"; U.S. Pat. No. 6,595,391, entitled "Aseptic liquid packaging fitment"; U.S. Pat. No. 6,481,468, entitled "Apparatus and method for providing container filling in an aseptic processing apparatus"; U.S. Pat. No. 6,475,435, entitled "Apparatus and method for providing sterilization zones in an aseptic packaging sterilization tunnel"; U.S. Pat. No. 6,440,107, entitled "Fluid delivery system and an aseptic connector for use therewith"; U.S. Pat. No. 6,431,227, entitled "Aseptic filling device"; U.S. Pat. No. 6,394,992, entitled "Aseptic connection device"; U.S. Pat. No. 6,357,488, entitled "Process for the transfer of aseptic products between two enclosures and transportation container for performing this process"; U.S. Pat. No. 6,326,032, entitled "Beverage manufacture and cold aseptic bottling using peroxyacid antimicrobial composition"; U.S. Pat. No. 6,314,987, entitled "Aseptic product discharge valve and method"; U.S. Pat. No. 6,257,463, entitled "Aseptic closure for containers of liquids"; U.S. Pat. No. 6,209,591, entitled "Apparatus and method for providing container filling in an aseptic processing apparatus"; U.S. Pat. No. 6,082,418, entitled "Aseptic container filling assembly"; and U.S. Pat. No. 6,070,622, entitled "High speed aseptic filling machine."

All of the patents, patent applications or patent publications, which were cited in the International Search Report dated Jan. 2, 2008, and/or cited elsewhere are hereby incorporated by reference as if set forth in their entirety herein as follows: US 2004/227302, having the title "DYNAMIC SEALING ARRANGEMENT FOR MOVABLE SHAFT," published on Nov. 18, 2004; U.S. Pat. No. 4,222,575, having the title "SHAFT SEAL DEVICE," published on Sep. 16, 1980; DE 11 44 873, having the German title "STOPFBÜCHSENANORDNUNG FÜR DIE KOLBENSTANGE VON TROCKENLAUFVERDICHTERN," published on Mar. 7, 1963; and DE 296 20 323, having the German title "DREHVERTEILER FÜR ROTIERENDE GEFÄβFÜLLMASCHINEN," published on Jan. 23, 1997.

All of the patents, patent applications or patent publications, which were cited in the German Office Action dated May 21, 2007, and/or cited elsewhere are hereby incorporated by reference as if set forth in their entirety herein as follows: DE 42 08 549, having the following English invasion of the German title "KEG-CLEANING OR FILLING STATION—HAS VERTICAL BARS SPACED APART ON KEG-LIFTING SUPPORT AND WORKING IN GUIDES," published on Sep. 23, 1993; DE 20 2005 014 423, having the following English translation of the German title "INFLATION VALVE FOR FILLING LIQUIDS E. G. BEER, WATER, MILK, INTO BOTTLES OR CONTAINERS, HAS VALVE ASSEMBLY AREA OPERABLE AS HERMETICALLY SEALED OR CLOSED AREA," published on Feb. 23, 2006; DE 100 46 798, having the following English translation of the German title "SEAL FOR ROTARY SHAFT IN HOUSING HAS SHAFT SEAL RING DEFINING PRESSURE DIFFERENTIAL TO PREVENT LOSS OF LUBRICANT," published on Apr. 25, 2002; DE 199 13 821, having the following English translation of the German title "SHAFT SEAL ASSEMBLY," published on Apr. 18, 2002; DE 202 12 246, having the following English translation of the German title "DEVICE AND PROCESS FOR PRODUCING OPTICAL MOLDED PARTS FROM PLASTIC," published on Nov. 7, 2002; DE 694 23 493, having the following English translation of the German title "DOUBLE SEAT VALVE," published on Nov. 6, 1986; and DE 35 16 128, having the following English translation of the German title "SEALING ARRANGEMENT FOR A SWIVEL," published on Nov. 2, 2000.

The patents, patent applications, and patent publications listed above, beginning on line 1026 on page 49 in the paragraph with the phrase: "Some examples of clean rooms . . . " and ending on line 1117 on page 54 in the paragraph with the phrase: " . . . published on Nov. 2, 2000" are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 038 747.3, filed on Aug. 17, 2006, having inventors Bernd NEUMANN and Matthias BESTMANN, and DE-OS 10 2006 038 747.3 and DE-PS 10 2006 038 747.3, and International Application No. PCT/EP2007/007191, filed on Aug. 15, 2007, having WIPO Publication No. WO 2008/019831 and inventors Bernd NEUMANN and Matthias BESTMANN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/007191 and German Patent Application 10 2006 038 747.3 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/007191 and DE 10 2006 038 747.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Pivot bearing device
2 Stationary part
3 Rotary part
4 Sealing arrangement
5 First seal
6 Second seal
7 Chamber
8 Inlet
9 Outlet
10 Bearing
20 Rotary distributor
21 Front plate
22 Stationary part
23 Rotary part
24 Connector
25 Annular space
26 Center section
27 Connector
28 Annular space
29 Passage
30 Connector
31 Annular space
32 Connector
33 Connector
34 Annular space
35 Connecting line
40 Sealing arrangement
41 Seal
42 Seal
43 Chamber
44 Seals
45 Chamber
46 Seals
47 Chamber
48 Empty space
49 Seals
50 Seals
51 Chamber
52 Seals
53 Chamber
54 Lines
55 Connector
56 Connector
57 Line
58 Connector
59 Connector

What is claimed is:

1. A sealing arrangement comprising a plurality of pairs of first and second annular seals, with a rotatable bearing device, said rotatable bearing device comprising a stationary part, a rotatable part, and a plurality of annular spaces disposed about said rotatable part, wherein at least one of said pairs of first and second annular seals is disposed between every two of said annular spaces, and wherein, for each of said pairs of first and second annular seals:

said stationary part comprises a first annular recess, a second annular recess, and a third annular recess, each having first and second side walls;

said stationary part comprises a first portion disposed between said first and second annular recesses, which first portion forms said second side wall of said first annular recess and said first side wall of said second annular recess;

said stationary part comprises a second portion disposed between said second and third annular recesses, which second portion forms said second side wall of said second annular recess and said first side wall of said third annular recess;

each of said first and second portions have an end face that is opposed to an outer surface of said rotatable part;

said first annular seal is disposed in said first annular recess, and is configured to contact the outer surface of said rotatable part;

said second annular seal is disposed in said third annular recess and is configured to contact the outer surface of said rotatable part; and said second annular recess and the outer surface of said rotatable part define a chamber disposed between said annular seals and configured to receive a disinfectant barrier medium therein.

2. The sealing arrangement according to claim 1, wherein each of said annular seals has an essentially equivalent cross-sectional width and cross-sectional height.

3. The sealing arrangement according to claim 1, in combination with a reservoir of disinfectant barrier medium, wherein said reservoir is operatively connected to each chamber and configured to conduct disinfectant barrier medium through each chamber at lower-than-ambient pressure.

4. The sealing arrangement according to claim 1, wherein:

each chamber is configured to receive either a liquid or a gaseous disinfectant barrier medium comprising hydrogen peroxide;

each chamber comprises at least one barrier medium inlet;

each chamber comprises at least one barrier medium outlet;

said at least one barrier medium inlet and said at least one barrier medium outlet together being configured to permit circulation of barrier medium through their chamber; and the rotary bearing arrangement comprises at least one of: a pressure monitor to monitor the pressure in each chamber, and a level monitor to monitor the concentration of hydrogen peroxide in the disinfectant barrier medium.

5. The sealing arrangement according to claim 1, wherein each chamber is the only portion of said sealing arrangement or said rotatable bearing device configured to receive the disinfectant barrier medium therein.

6. The sealing arrangement according to claim 1, disposed in an aseptic beverage container handling machine, wherein said rotatable part is connected to a rotary base plate of said aseptic beverage container handling machine, and each chamber is configured to be filled with disinfectant barrier medium during handling of containers by said aseptic beverage container handling machine.

* * * * *